UNITED STATES PATENT OFFICE.

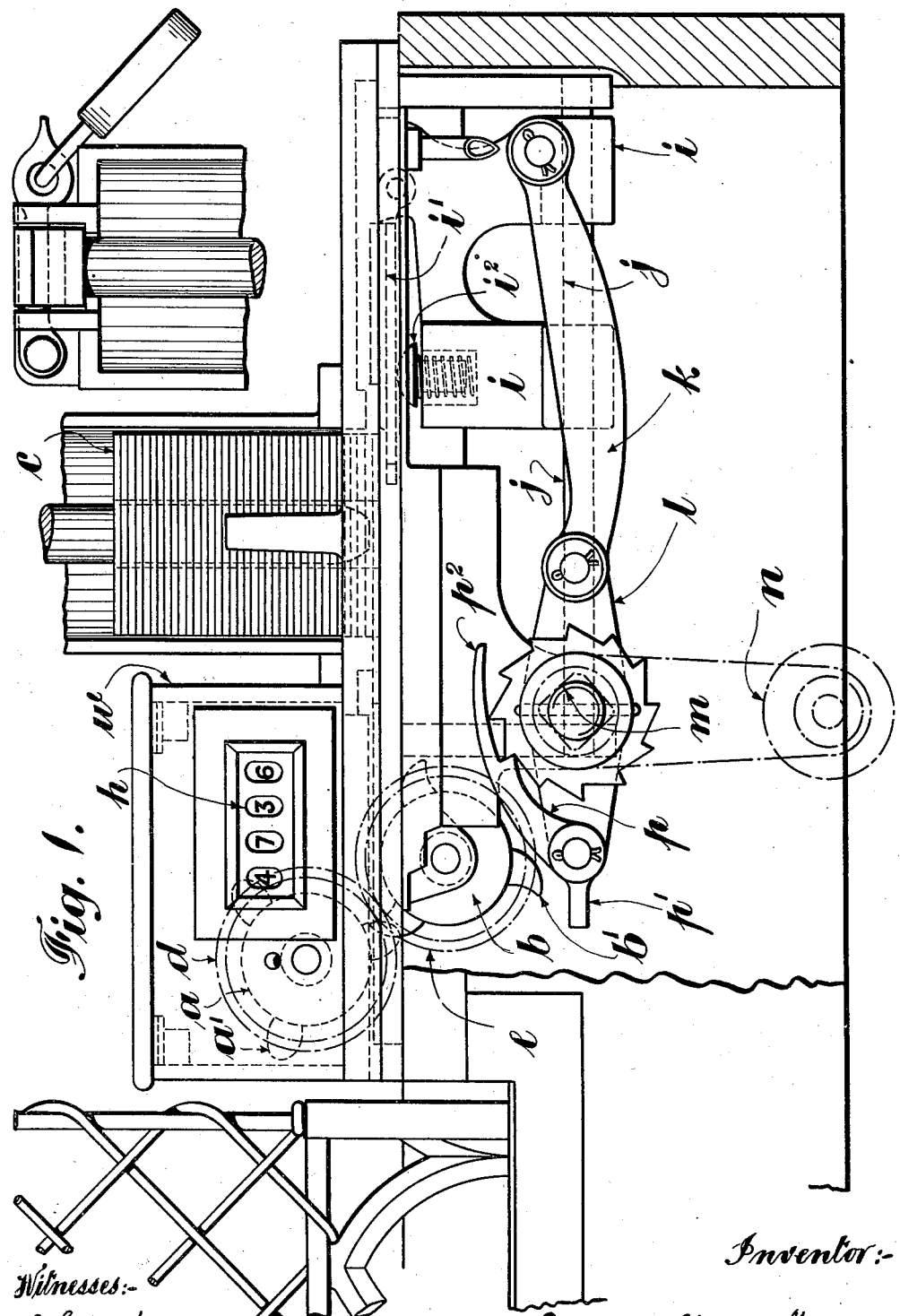

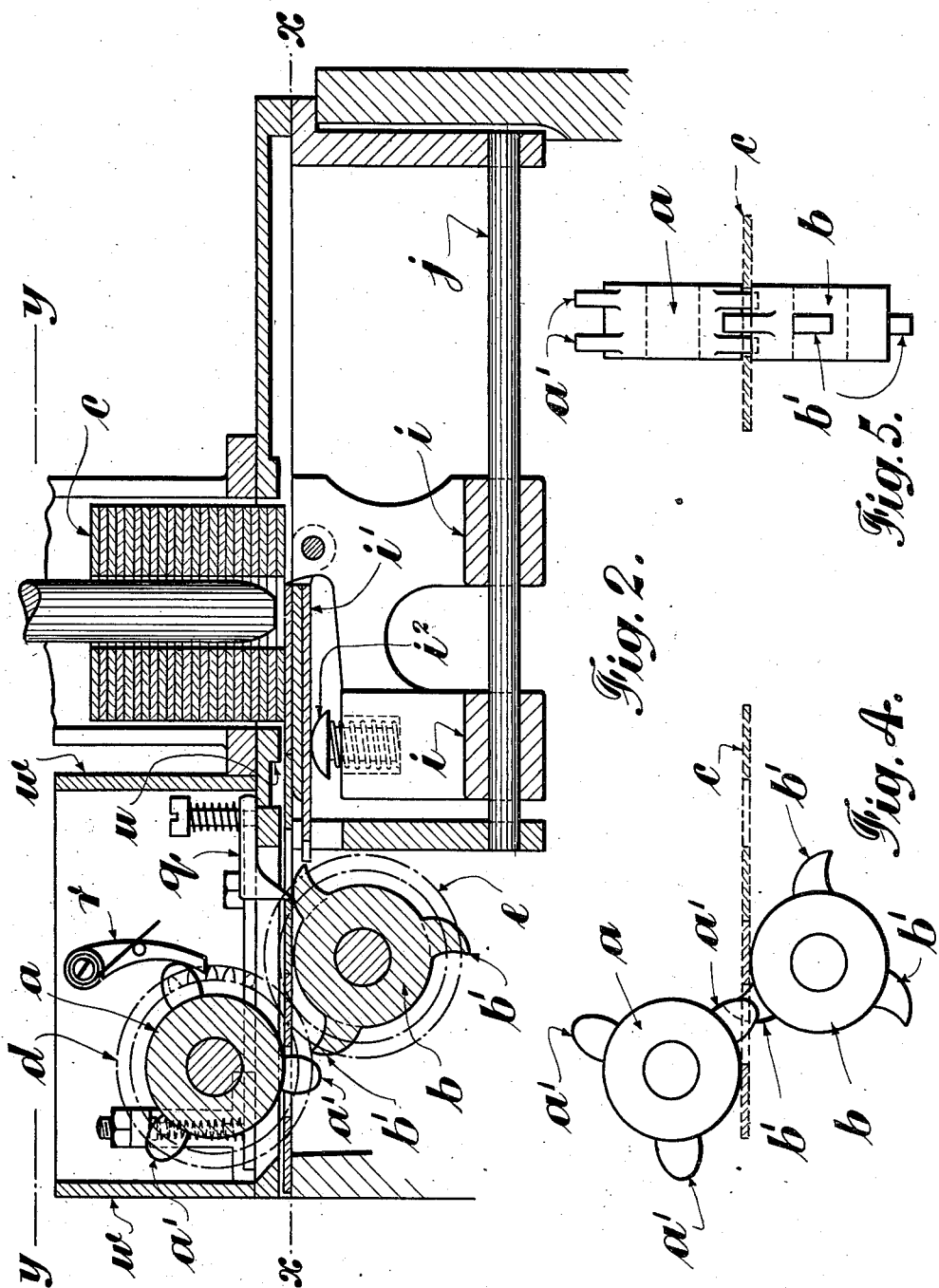

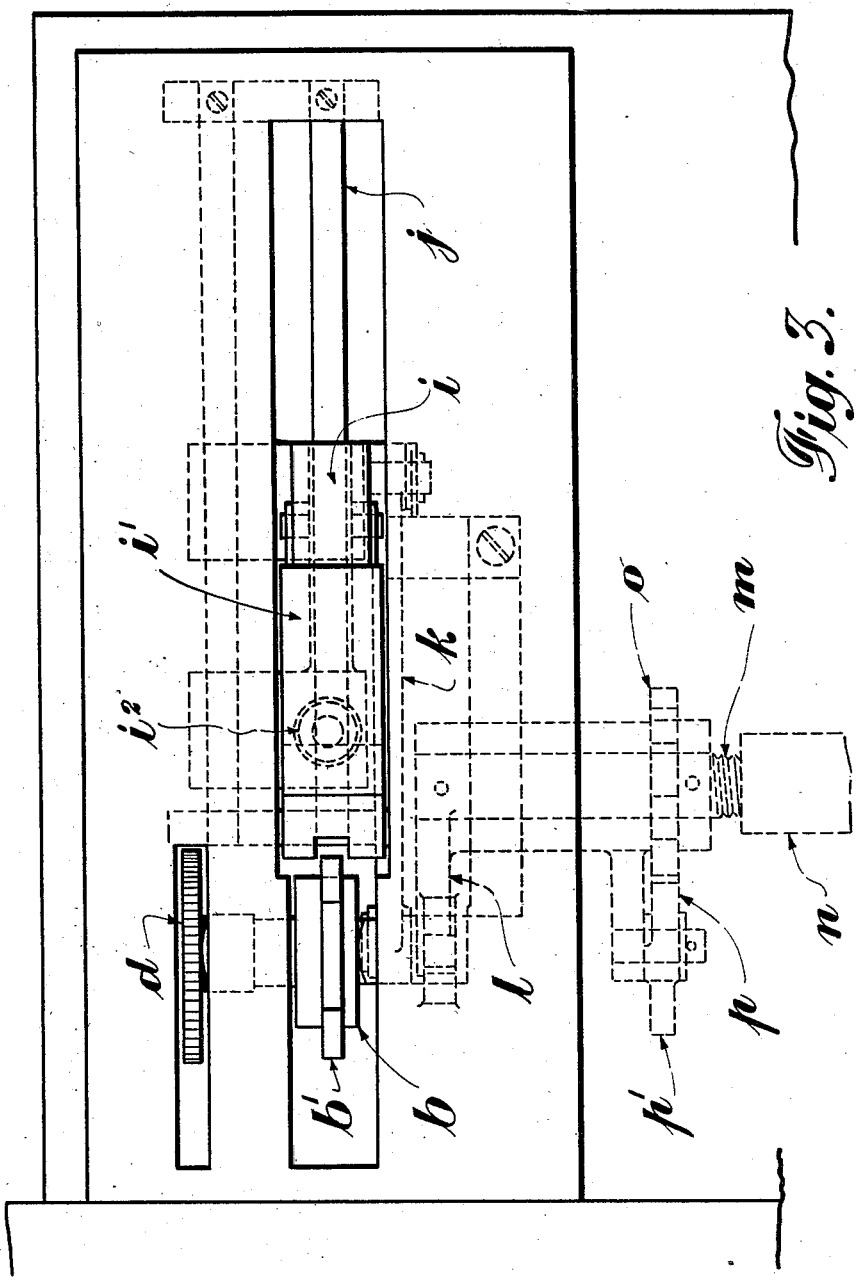

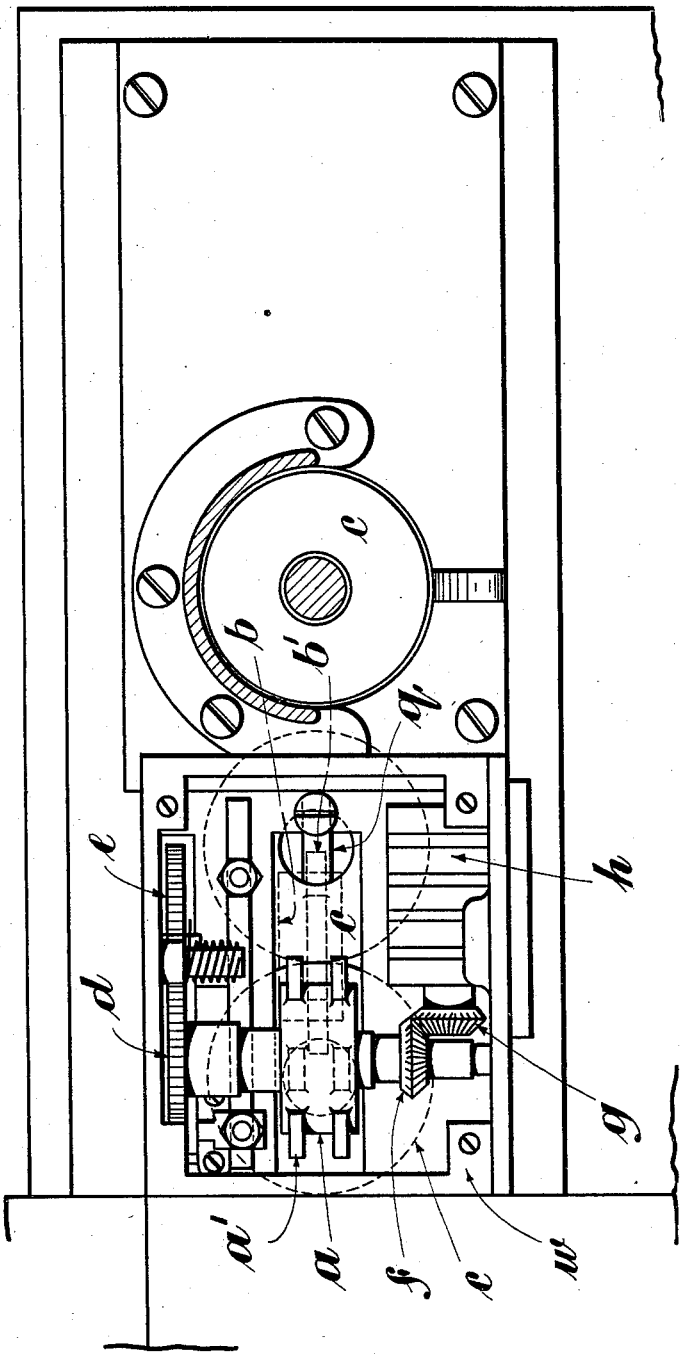

EDWARD THOMAS MIDDLEMISS, OF MANCHESTER, ENGLAND.

CHECK-ISSUING MACHINE.

1,073,272.  Specification of Letters Patent. Patented Sept. 16, 1913.

Application filed September 16, 1912. Serial No. 720,490.

*To all whom it may concern:*

Be it known that I, EDWARD THOMAS MIDDLEMISS, a subject of the King of Great Britain and Ireland, and resident of Manchester, England, have invented certain new and useful Improvements in Check-Issuing Machines, of which the following is a specification.

This invention refers to check-issuing machines as used in theater pay-boxes and other places for issuing metal and other checks one by one, and the object of the invention is to provide an improved arrangement of devices whereby a check cannot be delivered without the counter being operated and also whereby the checks cannot possibly be returned.

A further object is to provide an arrangement of mechanism which will operate with practically any shape of check having a central aperture, while another object is to prevent jamming of the checks while being ejected.

Another object is to obtain the desired safeguards by an arrangement of mechanism occupying a comparatively small space.

In order that the invention may be clearly understood reference will now be made to the accompanying drawings whereon, Figure 1 illustrates in elevation the complete machine. Fig. 2 illustrates a sectional elevation. Figs. 3 and 3ª illustrate plans on lines $x$—$x$ and $y$—$y$ respectively. Figs. 4 and 5 are illustrative of details.

In carrying out the invention use is made of two disks or rollers $a$, $b$, the former provided with bifurcated teeth or pegs $a'$ and the latter $b$ having flattened teeth $b'$ preferably straight or slightly concave on one face. The wheel $a$ is arranged above and in advance of the wheel $b$, the vertical space between the peripheries of the two wheels or rollers being approximately equal to the thickness of a check $c$ and the teeth being designed and arranged so that as the tooth of one wheel moves out of the aperture in a check, a tooth of the other wheel moves in. Upon the axis of the roller $a$ is a spur wheel $d$ gearing with a spur wheel $e$ on the axis of the roller $b$. Also upon the axis of the roller $a$ is a bevel pinion $f$ which gears with a further bevel pinion $g$ which operates the counter $h$.

The means for moving the check consist of a slide $i$ mounted on horizontal rods $j$ and a link $k$ connected to a crank $l$ which latter is secured to one end of a shaft $m$. At the forward end of the shaft $m$ is mounted a winch or like handle $n$. To prevent backward rotation of the shaft $m$ a ratchet wheel $o$ and pawl $p$ are provided the ratchet wheel being secured to the shaft $m$ and the pawl to the shaft bearing, while the handle $n$ will preferably be screwed on to the shaft $m$ so that on being rotated to the left it will unscrew and may be removed. The pawl $p$ may however be provided with a finger $p'$ to enable the pawl to be held out of action should it be desired to ease or reverse the slide at any time, while a further extension $p^2$ is designed to engage the top of the casing and insure of the pawl being returned when the finger $p'$ is released.

The slide $i$ is preferably made in two parts, the upper part $i'$ which receives and carries the checks forward being hinged to the lower part. In the forward end of the lower part of the slide will be a spring pressed plunger $i^2$ which normally holds the hinged part $i'$ of the slide raised or in a horizontal position. This construction of slide obviates any jamming should a slightly bent check be passed through the machine. A spring pressed pawl $q$ enters the central opening of each check as it leaves the column and prevents any unauthorized return of the check. A further pawl $r$ engaging the teeth of the wheel $d$ prevents any backward rotation of the disk or roller $a$.

The counter with its operating mechanism, the check column and the check operating slide $i$ are mounted in a self-contained fitment ready for being fixed to a desk or other object with which it may require to be used. Further, the roller $a$ and counter $h$ are inclosed in a cover.

Upon the machine being operated to deliver the checks each check $c$ will pass between the rollers $a$, $b$ and in coming against the teeth $b'$, $a'$ will rotate the rollers a portion of a revolution, each succeeding check pushing forward the check in front of it and thus continuously rotating the rollers $a$, $b$. As the rollers rotate the teeth on the rollers project through the hole in the check, the teeth $b'$ on the roller or disk $b$ leaving the hole almost simultaneously as the teeth $a'$ of the roller or disk $a$ enter, the teeth $b'$ being designed to pass through the bifurcated teeth $a'$ without interruption, see Figs.

4 and 5. By this arrangement of toothed rollers or disks and with one roller arranged slightly in advance of the other, comparatively small rollers can be used with a minimum number of teeth pitched at such a distance apart that no check can possibly pass the rollers without rotating them.

What I claim is:—

1. The combination in a check-issuing machine of two rollers one having bifurcated teeth and the other flat teeth with inclined edge and designed to pass through the bifurcation of the teeth of the other roller, a reciprocating check-carrying slide, means for operating said slide and means whereby with a check on the slide, the rollers are rotated, substantially as set forth.

2. In a check-issuing machine, the combination of two toothed rollers arranged one in advance of and above the other a reciprocating check carrying slide and means for operating the slide and with a check on the slide for rotating the rollers, the checks each having a central opening to engage the teeth of the rollers, substantially as described.

3. In a check-issuing machine, the combination of two toothed rollers arranged one in advance of and above the other, a reciprocating check carrying slide means for operating said slide to push a check from below a column of checks and means for preventing the returning of the checks, substantially as herein described.

4. In a check-issuing machine, the combination of two toothed rollers, a reciprocating check carrying slide having an upper hinged part resting on a spring-controlled plunger, a link connected to said slide, a crank connected to said link and a shaft and winch handle for operating said crank, substantially as described.

In witness whereof I have hereunto set my hand in the presence of two witnesses.

EDWARD THOMAS MIDDLEMISS.

Witnesses:
P. D. BAILEY,
F. C. PENNINGTON.